(12) United States Patent
Schafer et al.

(10) Patent No.: US 12,576,968 B2
(45) Date of Patent: Mar. 17, 2026

(54) PALLET SKEW CORRECTION

(71) Applicant: GOODRICH CORPORATION, Charlotte, NC (US)

(72) Inventors: Ryan J. Schafer, Jamestown, ND (US); Mark L. Olson, Jamestown, ND (US); Ryan E. Pfau, Jamestown, ND (US); Joseph E. Brunner, Jamestown, ND (US); Scott P. Harms, Ypsilanti, ND (US); Louis C. Samuelson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 120 days.

(21) Appl. No.: 18/444,263

(22) Filed: Feb. 16, 2024

(65) Prior Publication Data

US 2025/0263168 A1 Aug. 21, 2025

(51) Int. Cl.
B64D 9/00 (2006.01)
B65G 13/02 (2006.01)
B65G 13/075 (2006.01)
B65G 43/08 (2006.01)

(52) U.S. Cl.
CPC ............... B64D 9/00 (2013.01); B65G 13/02 (2013.01); B65G 13/075 (2013.01); B65G 43/08 (2013.01); *B64D 2009/006* (2013.01)

(58) Field of Classification Search
CPC ...... B65G 13/02; B65G 13/075; B65G 43/08; B64D 9/00
See application file for complete search history.

(56) References Cited

U.S. PATENT DOCUMENTS

| | | | |
|---|---|---|---|
| 5,186,417 | A | 2/1993 | Pritchard |
| 6,705,817 | B2 | 3/2004 | Wittenstein et al. |
| 6,871,823 | B2 | 3/2005 | Roberts |
| 7,402,973 | B2 | 7/2008 | Hettwer |
| 9,650,139 | B2 | 5/2017 | Huber et al. |
| 2007/0138343 | A1 | 6/2007 | Hettwer |

(Continued)

OTHER PUBLICATIONS

GSTIR: Advantages of Infrared Sensors © 2021, https://www.gst-ir.net/news-events/infrared-knowledge/533.html (Year: 2021).*

(Continued)

*Primary Examiner* — Gene O Crawford
*Assistant Examiner* — Lester Rushin, III
(74) *Attorney, Agent, or Firm* — SNELL & WILMER L.L.P.

(57) ABSTRACT

A cargo handling system is provided. The cargo handling system includes a set of first power drive units, a set of second power drive units, and a controller. Each of the set of first power drive units and the set of second power drive units includes a drive roller, a motor configured to rotate the drive roller; and an infrared sensor. The controller is configured to send a command to engage the drive roller of each of the set of first power drive units to drive a cargo in a first direction and, responsive to receiving a first signal from the infrared sensor from a first power drive unit in the set of second power drive units, send a command to disengage a drive roller of a paired first power drive unit in the set of first power drive units.

20 Claims, 5 Drawing Sheets

(56) References Cited

U.S. PATENT DOCUMENTS

| | | | |
|---|---|---|---|
| 2007/0198343 A1* | 8/2007 | Collison | G06Q 30/02 |
| | | | 705/14.69 |
| 2012/0101636 A1* | 4/2012 | Huber | B64D 9/00 |
| | | | 700/275 |
| 2022/0073292 A1* | 3/2022 | Shivalinga | B65G 13/075 |
| 2023/0382530 A1 | 11/2023 | Kranz | |
| 2024/0317401 A1* | 9/2024 | Pereira | B64D 9/003 |

OTHER PUBLICATIONS

European Patent Office, European Search Report dated May 28, 2025 in Application No. 25156065.2.

* cited by examiner

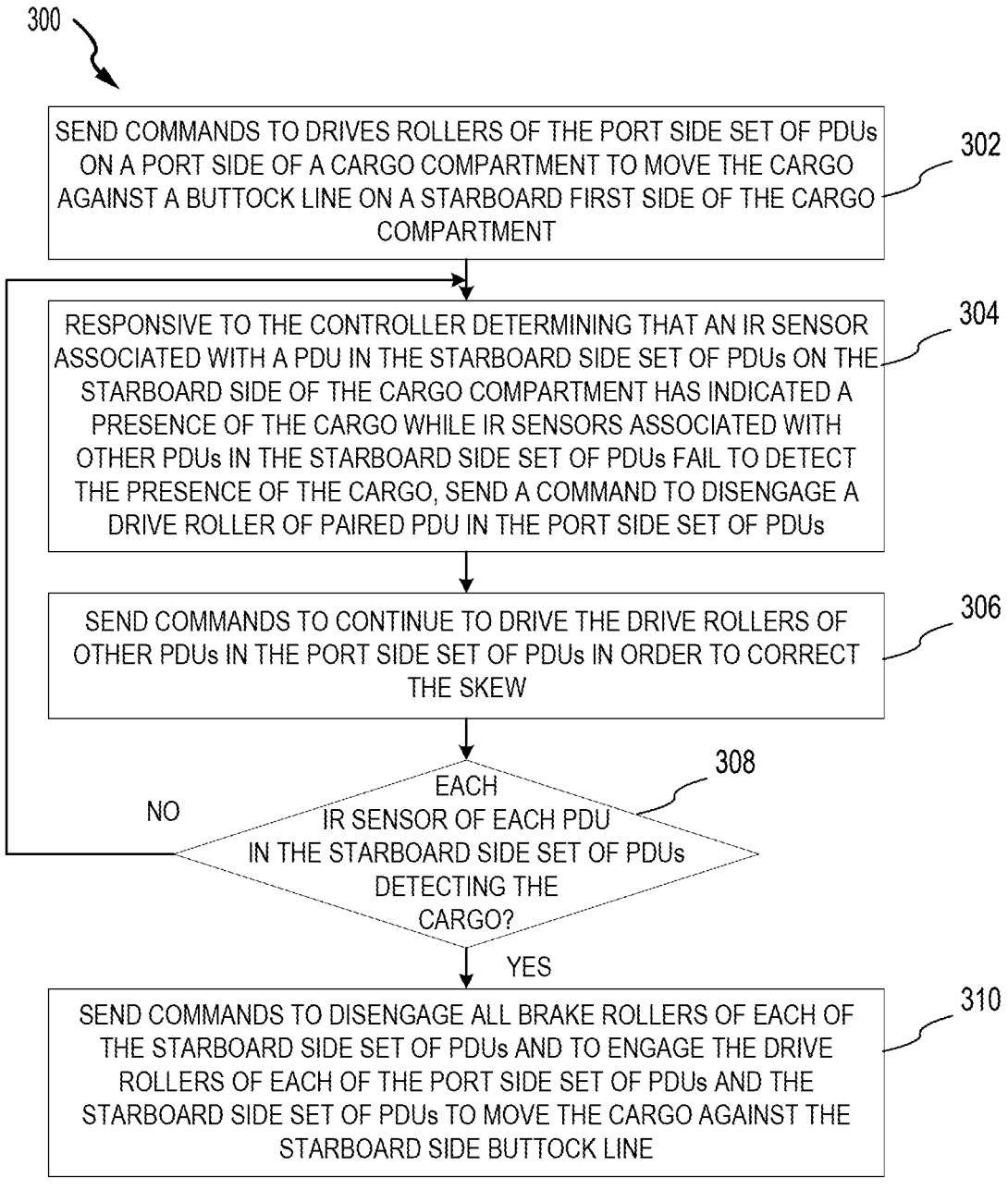

300

SEND COMMANDS TO DRIVES ROLLERS OF THE PORT SIDE SET OF PDUs ON A PORT SIDE OF A CARGO COMPARTMENT TO MOVE THE CARGO AGAINST A BUTTOCK LINE ON A STARBOARD FIRST SIDE OF THE CARGO COMPARTMENT
302

RESPONSIVE TO THE CONTROLLER DETERMINING THAT AN IR SENSOR ASSOCIATED WITH A PDU IN THE STARBOARD SIDE SET OF PDUs ON THE STARBOARD SIDE OF THE CARGO COMPARTMENT HAS INDICATED A PRESENCE OF THE CARGO WHILE IR SENSORS ASSOCIATED WITH OTHER PDUs IN THE STARBOARD SIDE SET OF PDUs FAIL TO DETECT THE PRESENCE OF THE CARGO, SEND A COMMAND TO DISENGAGE A DRIVE ROLLER OF PAIRED PDU IN THE PORT SIDE SET OF PDUs
304

SEND COMMANDS TO CONTINUE TO DRIVE THE DRIVE ROLLERS OF OTHER PDUs IN THE PORT SIDE SET OF PDUs IN ORDER TO CORRECT THE SKEW
306

EACH IR SENSOR OF EACH PDU IN THE STARBOARD SIDE SET OF PDUs DETECTING THE CARGO?
308

NO

YES

SEND COMMANDS TO DISENGAGE ALL BRAKE ROLLERS OF EACH OF THE STARBOARD SIDE SET OF PDUs AND TO ENGAGE THE DRIVE ROLLERS OF EACH OF THE PORT SIDE SET OF PDUs AND THE STARBOARD SIDE SET OF PDUs TO MOVE THE CARGO AGAINST THE STARBOARD SIDE BUTTOCK LINE
310

FIG.3

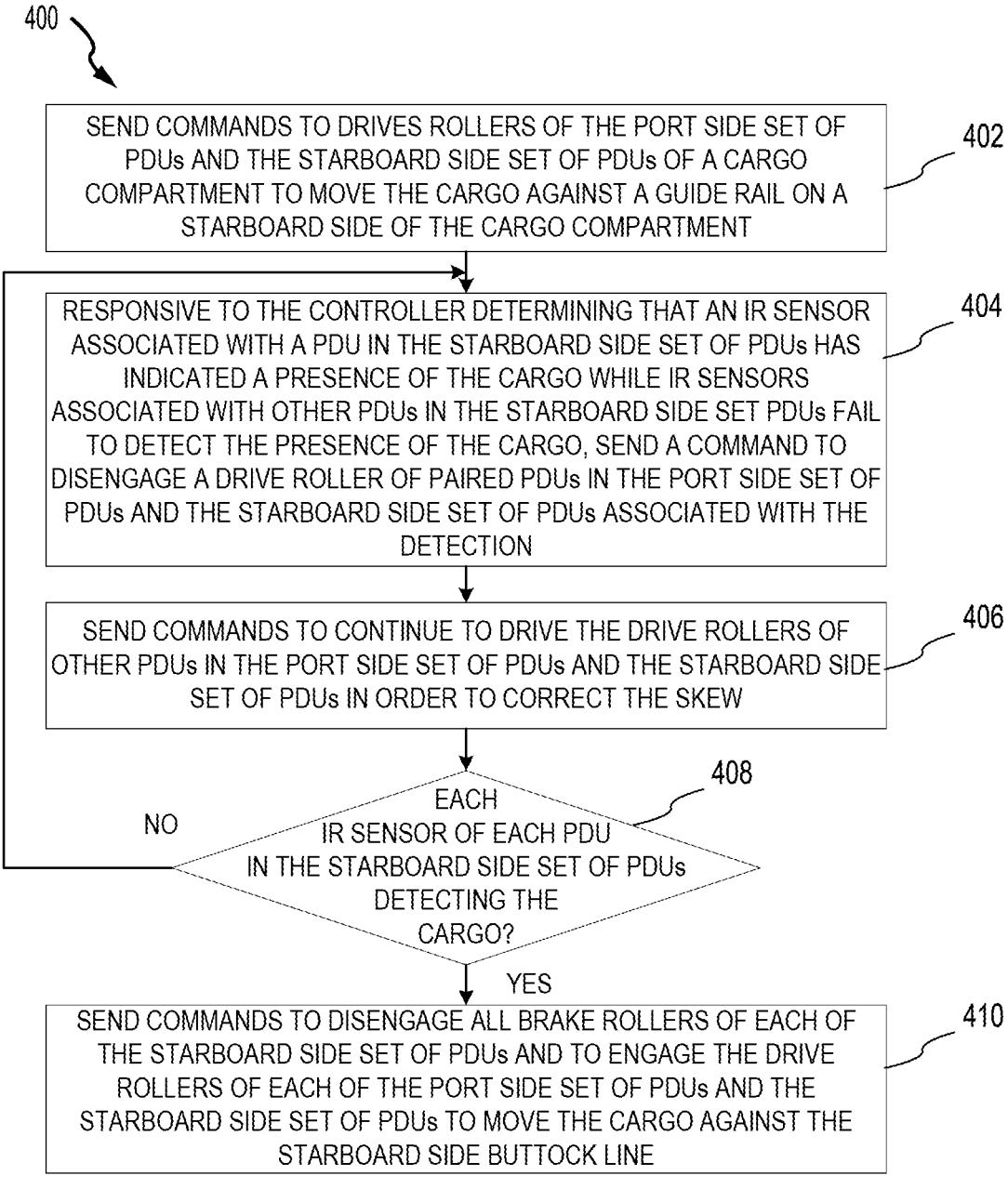

400

402 SEND COMMANDS TO DRIVES ROLLERS OF THE PORT SIDE SET OF PDUs AND THE STARBOARD SIDE SET OF PDUs OF A CARGO COMPARTMENT TO MOVE THE CARGO AGAINST A GUIDE RAIL ON A STARBOARD SIDE OF THE CARGO COMPARTMENT

404 RESPONSIVE TO THE CONTROLLER DETERMINING THAT AN IR SENSOR ASSOCIATED WITH A PDU IN THE STARBOARD SIDE SET OF PDUs HAS INDICATED A PRESENCE OF THE CARGO WHILE IR SENSORS ASSOCIATED WITH OTHER PDUs IN THE STARBOARD SIDE SET PDUs FAIL TO DETECT THE PRESENCE OF THE CARGO, SEND A COMMAND TO DISENGAGE A DRIVE ROLLER OF PAIRED PDUs IN THE PORT SIDE SET OF PDUs AND THE STARBOARD SIDE SET OF PDUs ASSOCIATED WITH THE DETECTION

406 SEND COMMANDS TO CONTINUE TO DRIVE THE DRIVE ROLLERS OF OTHER PDUs IN THE PORT SIDE SET OF PDUs AND THE STARBOARD SIDE SET OF PDUs IN ORDER TO CORRECT THE SKEW

408 EACH IR SENSOR OF EACH PDU IN THE STARBOARD SIDE SET OF PDUs DETECTING THE CARGO?

NO

YES

410 SEND COMMANDS TO DISENGAGE ALL BRAKE ROLLERS OF EACH OF THE STARBOARD SIDE SET OF PDUs AND TO ENGAGE THE DRIVE ROLLERS OF EACH OF THE PORT SIDE SET OF PDUs AND THE STARBOARD SIDE SET OF PDUs TO MOVE THE CARGO AGAINST THE STARBOARD SIDE BUTTOCK LINE

FIG.4

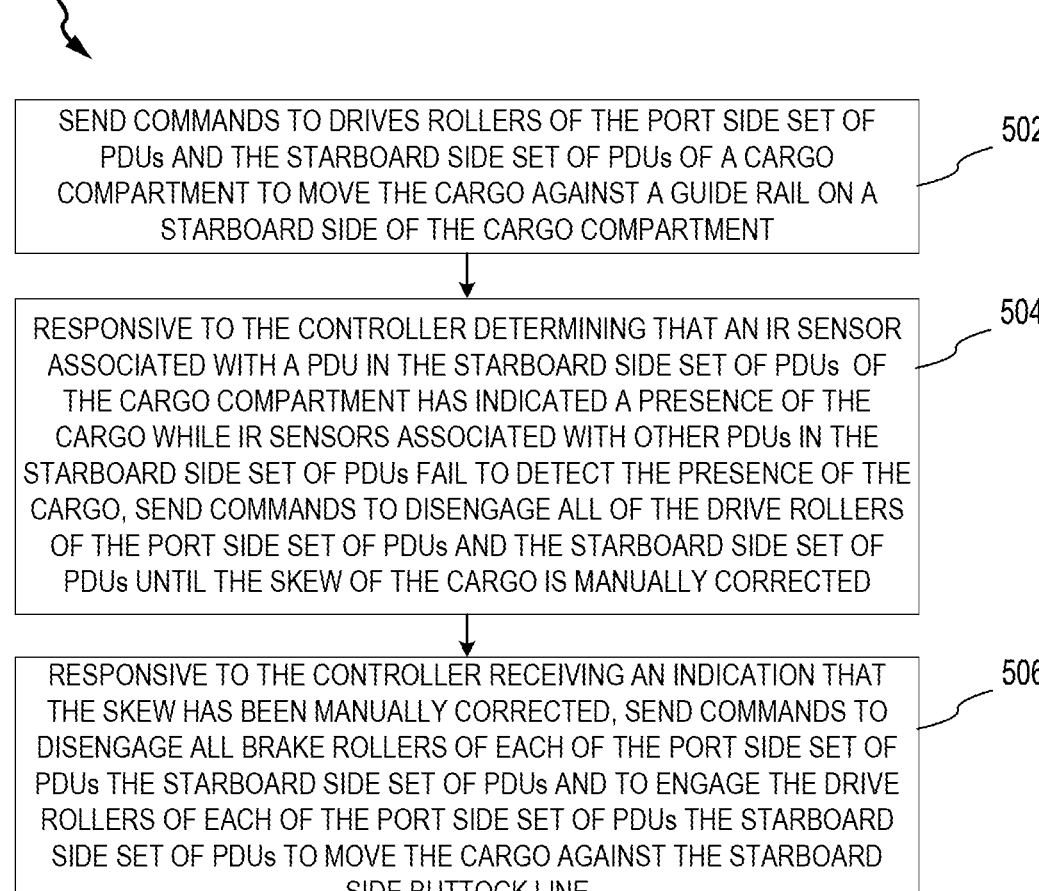

500

SEND COMMANDS TO DRIVES ROLLERS OF THE PORT SIDE SET OF PDUs AND THE STARBOARD SIDE SET OF PDUs OF A CARGO COMPARTMENT TO MOVE THE CARGO AGAINST A GUIDE RAIL ON A STARBOARD SIDE OF THE CARGO COMPARTMENT    502

RESPONSIVE TO THE CONTROLLER DETERMINING THAT AN IR SENSOR ASSOCIATED WITH A PDU IN THE STARBOARD SIDE SET OF PDUs OF THE CARGO COMPARTMENT HAS INDICATED A PRESENCE OF THE CARGO WHILE IR SENSORS ASSOCIATED WITH OTHER PDUs IN THE STARBOARD SIDE SET OF PDUs FAIL TO DETECT THE PRESENCE OF THE CARGO, SEND COMMANDS TO DISENGAGE ALL OF THE DRIVE ROLLERS OF THE PORT SIDE SET OF PDUs AND THE STARBOARD SIDE SET OF PDUs UNTIL THE SKEW OF THE CARGO IS MANUALLY CORRECTED    504

RESPONSIVE TO THE CONTROLLER RECEIVING AN INDICATION THAT THE SKEW HAS BEEN MANUALLY CORRECTED, SEND COMMANDS TO DISENGAGE ALL BRAKE ROLLERS OF EACH OF THE PORT SIDE SET OF PDUs THE STARBOARD SIDE SET OF PDUs AND TO ENGAGE THE DRIVE ROLLERS OF EACH OF THE PORT SIDE SET OF PDUs THE STARBOARD SIDE SET OF PDUs TO MOVE THE CARGO AGAINST THE STARBOARD SIDE BUTTOCK LINE    506

FIG.5

PALLET SKEW CORRECTION

FIELD

The present disclosure relates generally to cargo handling systems and, more particularly, to pallet skew correction during loading of cargo.

BACKGROUND

Conventional aircraft cargo systems typically include various tracks and rollers that span the length of an aircraft. Cargo may be loaded from an aft position on an aircraft and conducted by the cargo system to a forward position and/or, depending upon aircraft configuration, cargo may be loaded from a forward position on an aircraft and conducted by the cargo system to an aft position. Cargo systems, such as those used by aircraft for transport of heavy containerized cargo or pallets, also referred to as unit load devices (ULDs), typically include roller trays containing transport rollers which support the cargo. Motor driven rollers are typically employed in these systems. Aircraft often employ a series of motor driven power drive units (PDUs) to propel cargo containers and pallets within the aircraft cargo compartment. This configuration may allow for the transportation of cargo pallets within the aircraft cargo compartment by one or more operators controlling the PDUs.

SUMMARY

A cargo handling system is disclosed herein. The cargo handling system includes a set of first power drive units and a set of second power drive units. Each of the set of first power drive units and the set of second power drive units includes a drive roller, a motor configured to rotate the drive roller, and an infrared sensor. Each power drive unit in the set of first power drive units is paired with a power drive in the set of second power drive units. The cargo handling system further includes a controller. The controller is configured to send a command to engage the drive roller of each of the set of first power drive units to drive a cargo in a first direction and, responsive to receiving a first signal from the infrared sensor from a first power drive unit in the set of second power drive units, send a command to disengage the drive roller of a paired first power drive unit in the set of first power drive units.

In various embodiments, each of the set of first power drive units and the set of second power drive units further includes a brake roller. In various embodiments, the controller is further configured to, responsive to receiving the first signal from the infrared sensor from the first power drive unit in the set of second power drive units, send a command to engage, if not already engaged, a brake roller associated with the first power drive unit in the set of second power drive units.

In various embodiments, the controller is further configured to, responsive to receiving a second signal from the infrared sensor from a second power drive unit in the set of second power drive units, send a command to disengage the drive roller of a paired second power drive unit in the set of first power drive units and send a command to engage, if not already engaged, a brake roller associated with the second power drive unit in the set of second power drive units.

In various embodiments, the controller is further configured to, responsive to receiving a signal from each infrared sensor of the set of second power drive units: send a command to disengage all brake rollers associated with the set of second power drive units, and send a command to engage the drive roller of each of the set of first power drive units and the drive roller of each of the set of second power drive units to drive the cargo in the first direction.

In various embodiments, the controller is further configured to send a command to engage the drive roller of each of the set of second power drive units to drive the cargo in the first direction, and, responsive to receiving the first signal from the infrared sensor from the first power drive unit in the set of second power drive units, send a command to disengage the drive roller associated with the first power drive unit in the set of second power drive units.

In various embodiments, each of the set of first power drive units and the set of second power drive units further includes a brake roller. In various embodiments, the controller is further configured to, responsive to sending the command to disengage the drive roller associated with the first power drive unit in the set of second power drive units, sending a command to engage, if not already engaged, a brake roller associated with the first power drive unit in the set of second power drive units.

In various embodiments, the controller is further configured to, responsive to receiving a signal from each infrared sensor of the set of second power drive units: send a command to disengage all brake rollers associated with the set of second power drive units, and send a command to engage the drive roller of each of the set of first power drive units and the drive roller of each of the set of second power drive units to drive the cargo in the first direction.

In various embodiments, the controller is configured to send a command to engage the drive roller of each of the set of second power drive units to drive the cargo in the first direction; responsive to receiving the first signal from the infrared sensor from the first power drive unit in the set of second power drive units, send a command to disengage all drive rollers in the set of first power drive units and the set of second power drive units; and, responsive to receiving a signal from each infrared sensor of the set of second power drive units, send a command to engage the drive roller of each of the set of first power drive units and the drive roller of each of the set of second power drive units to drive the cargo in the first direction.

Also disclosed herein is an aircraft. The aircraft includes a cargo handling system includes a set of first power drive units and a set of second power drive units. Each of the set of first power drive units and the set of second power drive units includes a drive roller, a motor configured to rotate the drive roller, and an infrared sensor. Each power drive unit in the set of first power drive units is paired with a power drive in the set of second power drive units. The cargo handling system further includes a controller, The controller is configured to send a command to engage the drive roller of each of the set of first power drive units to drive a cargo in a first direction and, responsive to receiving a first signal from the infrared sensor from a first power drive unit in the set of second power drive units, send a command to disengage the drive roller of a paired first power drive unit in the set of first power drive units.

In various embodiments, each of the set of first power drive units and the set of second power drive units further includes a brake roller. In various embodiments, the controller is further configured to, responsive to receiving the first signal from the infrared sensor from the first power drive unit in the set of second power drive units, send a command to engage, if not already engaged, a brake roller associated with the first power drive unit in the set of second power drive units.

In various embodiments, the controller is further configured to, responsive to receiving a second signal from the infrared sensor from a second power drive unit in the set of second power drive units, send a command to disengage the drive roller of a paired second power drive unit in the set of first power drive units and send a command to engage, if not already engaged, a brake roller associated with the second power drive unit in the set of second power drive units.

In various embodiments, the controller is further configured to, responsive to receiving a signal from each infrared sensor of the set of second power drive units: send a command to disengage all brake rollers associated with the set of second power drive units, and send a command to engage the drive roller of each of the set of first power drive units and the drive roller of each of the set of second power drive units to drive the cargo in the first direction.

In various embodiments, the controller is further configured to send a command to engage the drive roller of each of the set of second power drive units to drive the cargo in the first direction, and, responsive to receiving the first signal from the infrared sensor from the first power drive unit in the set of second power drive units, send a command to disengage the drive roller associated with the first power drive unit in the set of second power drive units.

In various embodiments, each of the set of first power drive units and the set of second power drive units further includes a brake roller. In various embodiments, the controller is further configured to, responsive to sending the command to disengage the drive roller associated with the first power drive unit in the set of second power drive units, sending a command to engage, if not already engaged, a brake roller associated with the first power drive unit in the set of second power drive units.

In various embodiments, the controller is further configured to, responsive to receiving a signal from each infrared sensor of the set of second power drive units: send a command to disengage all brake rollers associated with the set of second power drive units, and send a command to engage the drive roller of each of the set of first power drive units and the drive roller of each of the set of second power drive units to drive the cargo in the first direction.

In various embodiments, the controller is configured to send a command to engage the drive roller of each of the set of second power drive units to drive the cargo in the first direction; responsive to receiving the first signal from the infrared sensor from the first power drive unit in the set of second power drive units, send a command to disengage all drive rollers in the set of first power drive units and the set of second power drive units; and, responsive to receiving a signal from each infrared sensor of the set of second power drive units, send a command to engage the drive roller of each of the set of first power drive units and the drive roller of each of the set of second power drive units to drive the cargo in the first direction.

Additionally disclosed herein is a method for correcting skewed cargo. The method includes sending, by a controller, a command to engage a drive roller of each of a set of first power drive units to drive a cargo in a first direction, and, responsive to receiving a first signal from the infrared sensor from a first power drive unit in a set of second power drive units, sending, by the controller, a command to disengage the drive roller of a paired first power drive unit in the set of first power drive units.

In various embodiments, the method further includes, responsive to receiving the first signal from the infrared sensor from the first power drive unit in the set of second power drive units, sending, by the controller, a command to engage, if not already engaged, a brake roller associated with the first power drive unit in the set of second power drive units.

In various embodiments, the method further includes, responsive to receiving a second signal from the infrared sensor from a second power drive unit in the set of second power drive units: sending, by the controller, a command to disengage the drive roller of a paired second power drive unit in the set of first power drive units and sending, by the controller, a command to engage, if not already engaged, a brake roller associated with the second power drive unit in the set of second power drive units.

In various embodiments, the method further includes, responsive to receiving a signal from each infrared sensor of the set of second power drive units: sending, by the controller, a command to disengage all brake rollers associated with the set of second power drive units, and sending, by the controller, a command to engage the drive roller of each of the set of first power drive units and the drive roller of each of the set of second power drive units to drive the cargo in the first direction.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3 illustrates a method for controlling the skew of cargo during loading, in accordance with various embodiments.

FIG. 4 illustrates a method for controlling the skew of cargo during loading, in accordance with various embodiments.

FIG. 5 illustrates a method for controlling the skew of cargo during loading, in accordance with various embodiments.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Figure 2:
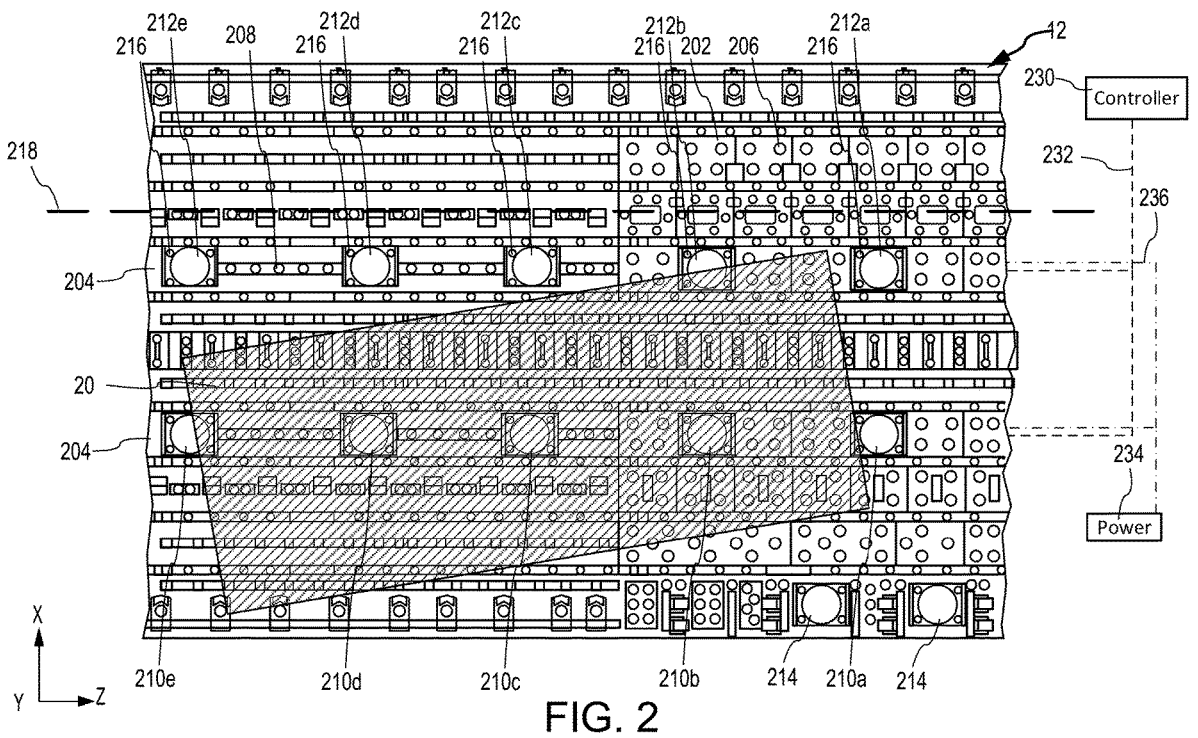
FIG. 2 illustrates a portion of a cargo deck with a skewed pallet, in accordance with various embodiments.

Main deck cargo systems in cargo aircrafts commonly carry longer in length pallets, such as 16-foot-long pallets and 20-foot-long pallets, among others. These longer in length pallets utilize a load procedure that rotates these pallets 90 degrees due to a size of the cargo door of the cargo aircraft and a size of the loader utilized to load the cargo aircraft. If the pallets are of a weight that is greater than a typical pallet, the load procedure may require the pallets to be positioned in a centerline position instead of a side-by-side position. During the load procedure these pallets are translated from a port side of the cargo compartment to the centerline of the cargo compartment. During such loading procedures, the translation action may cause the pallet to skew, i.e. at least one edge of the pallet becoming not parallel or substantially parallel from a lateral side of the aircraft, as is illustrated in FIG. 2 described hereafter.

Disclosed herein is a system for pallet skew correction for aerospace cargo systems. Aircrafts often employ a series of motor driven power drive units (PDUs) located in the floor of the cargo handling system. These PDUs are configured to propel cargo containers and pallets within the aircraft cargo compartment. This configuration may allow for the transportation of cargo pallets within the aircraft cargo compartment by one or more controllers or operators controlling the PDUs. Typically, these PDUs are configured with integrated infrared (IR) sensors. In various embodiments, responsive to a translation action of a pallet causes the pallet to skew within the cargo compartment, the control system coupled to the PDUs utilizes signals from the IR sensors in the PDUs to reduce pallet skew and limit abuse, i.e. load shifts or impacts, among others, to the cargo on the pallet or the aircraft, i.e. the pallet impacting guide surfaces within the cargo compartment and/or cargo moving while on the pallet with respect to the pallet.

In various embodiments, as a skewed pallet translates laterally from the port side of the cargo compartment to the centerline of the cargo compartment within the cargo compartment, the control system software may be configured to disengage specific ones of the PDUs in the drive system as well as engage brakes of the specific ones of the PDUs responsive to IR sensors of those specific ones of the PDUs are blocked. The disengagement of the drive of the specific ones of the PDUs and the application of braking may allow the other PDUs associated with the pallet to straighten the pallet from the skewed position and reduce abuse, i.e. load shifts or impacts, among others, to the cargo on the pallet or the aircraft, i.e. the pallet impacting guide surfaces within the cargo compartment and/or cargo moving while on the pallet with respect to the pallet.

Figure 1:
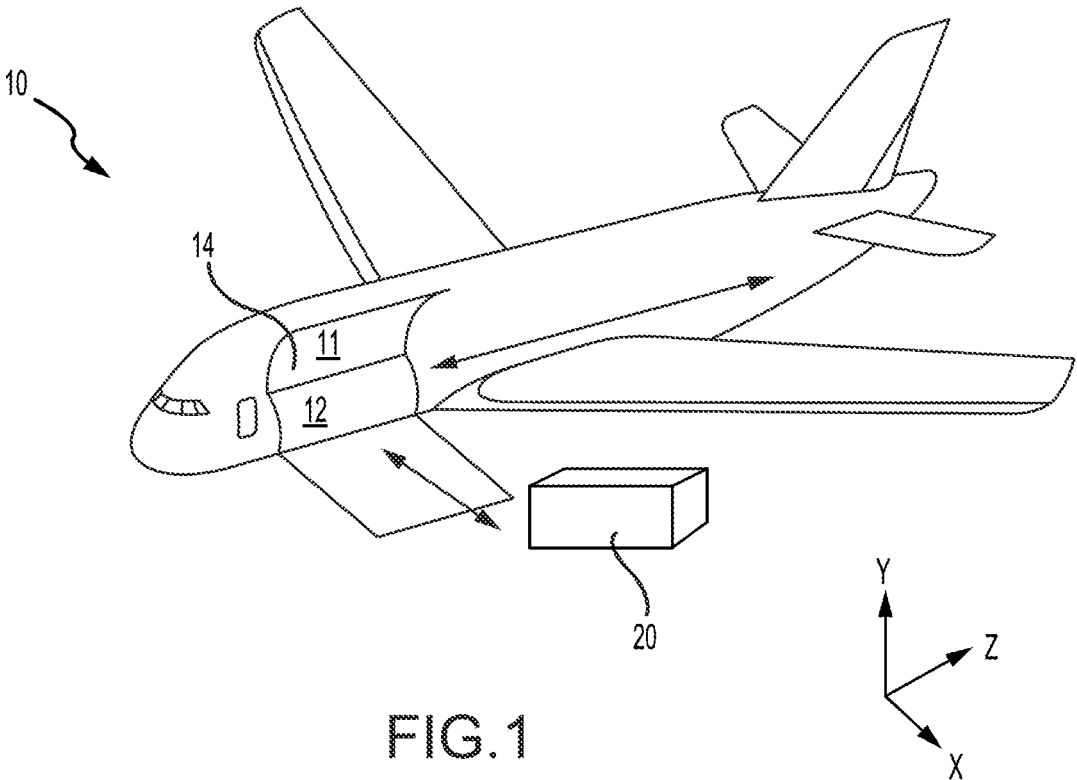
FIG. 1 illustrates an aircraft being loaded with cargo, in accordance with various embodiments.

Referring now to FIG. 1, an aircraft 10 having a cargo deck 12 is illustrated, in accordance with various embodiments. Aircraft 10 may include a cargo load door 14, for example, at a side of the fuselage structure of the aircraft 10. Cargo 20 may be loaded through cargo load door 14 and onto cargo deck 12 of aircraft 10 or unloaded from the cargo deck 12 of the aircraft 10.

Items to be shipped by air, freight, and/or the like are typically loaded first onto specially configured pallets or into specially configured containers. In aviation, those various pallets and/or containers are commonly referred to as unit load devices (ULDs). ULDs are available in various sizes and capacities and are typically standardized in dimension and shape. In various embodiments, cargo 20 may be a ULD.

Once loaded, the ULD is transferred to the aircraft, and is loaded onto the aircraft 10 through the cargo load door 14 using a conveyor ramp, scissor lift, or the like. Once inside the aircraft 10, the ULD is moved within the cargo hold to its final stowage position. Multiple ULDs may be brought on-board the aircraft, with each ULD being placed in its respective stowage and transportation position in on cargo deck 12. After the aircraft 10 has reached its destination, the ULDs are unloaded from the aircraft 10 similarly, but in reverse sequence to the loading procedure. To facilitate movement of cargo 20 along the cargo deck 12, aircraft 10 may include a cargo handling system as described herein in accordance with various embodiments.

Referring now to FIG. 2, a portion of cargo deck 12 with a skewed pallet is illustrated with XYZ axes for case of illustration, in accordance with various embodiments. In various embodiments, the cargo deck 12 includes a cargo handling system 200 that may include one or more ball panels 202 and one or more roller trays 204. Ball panels 202 may include a plurality of freely rotating conveyance balls 206 and roller trays 204 include a plurality of freely rotating conveyance rollers 208. Roller trays 204 may be positioned longitudinally along cargo deck 12 in the z-direction. In various embodiments, a number of PDUs 210a-210e, 212a-212e, and 214 may be mounted along cargo deck 12. For example, PDUs 210a-210e, 212a-212e, and 214 may be located in ball panels 202 and/or in roller trays 204. More specifically, in various embodiments, PDUs 210a-210e may be located in ball panels 202 and/or in roller trays 204 along a port side of the cargo deck, PDUs 212a-212e may be located in ball panels 202 and/or in roller trays 204 along a starboard side of the cargo deck, and PDUs 214 may be located at the entrance of the cargo load door, such as cargo load door 14 of FIG. 1. In various embodiments, PDUs 210a-210e, 212a-212e, and 214 are configured to propel a pallet, hereinafter referred to as cargo 20, over conveyance balls 206 and conveyance rollers 208 and across and along cargo deck 12.

in various embodiments, PDUs 210a-210e, 212a-212e, and 214 may include one or more drive rollers, which may be actively controlled by a motor via a command from a controller. PDUs 210a-210e, 212a-212e, and 214, including drive rollers, provide a mechanism upon which cargo 20 is propelled over the conveyance rollers 208. The cargo 20 may contact the drive rollers of PDUs 210a-210e, 212a-212e, and 214 located within the ball panels 202 and the roller trays 204 to provide motive force for the cargo 20. Each of PDUs 210a-210e, 212a-212e, and 214 may include an actuator, such as an electrically operated motor, which drives one or more drive rollers via a command from a controller. In various embodiments, a drive roller may be raised from a lowered position beneath the conveyance surface to an elevated position above conveyance surface. As used with respect to cargo deck 12, the term "beneath" may refer to the negative y-direction, and the term "above" may refer to the positive y-direction with respect to the provided XYZ axes. In the elevated position, a drive roller contacts and drives the overlying the cargo 20 that rides on the conveyance rollers 208. In accordance with various embodiments, the drive roller may be held or biased in a position above the conveyance surface by a spring.

in various embodiments, a number of brake rollers may be located along cargo deck 12 within or adjacent to PDUs 210a-210e, 212a-212e, and 214. In addition to drive rollers and the brake rollers, each of PDUs 210a-210e, 212a-212e, and 214 may be configured with one or more IR sensors 216.

In various embodiments, the IR sensors 216 are configured to detect the presence of cargo 20 above the PDUs 210a-210e, 212a-212e, and 214.

In various embodiments, the cargo handling system 200 may include a controller 230 in communication with the PDUs 210a-210e, 212a-212e, and 214 via a plurality of channels 232. Channels 232 may be a data bus, such as a controller area network (CAN) bus and may include one or more CAN busses or multi-CANs. An operator may selectively control operation of PDUs 210a-210e, 212a-212e, and 214 using controller 230. Controller 230 may be configured to engage and/or disengage various ones of the PDUs 210a-210e, 212a-212e, and 214 of the cargo deck 12. Thus, cargo handling system 200 may receive operator input through controller 230 to control the PDUs 210a-210e, 212a-212e, and 214 to manipulate the cargo 20 into a desired position on cargo deck 12. Controller 230 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The cargo handling system 200 may also include a power source 234 configured to supply power to the PDUs 210a-210e, 212a-212e, and 214 and/or other components of cargo handling system 200 via one or more power busses 236. As described below, in various embodiments, the controller 230 may be complimented by or substituted with one or more local controllers, whereby control of each PDU or groups of PDUs is performed by individual local controllers configured to communicate with one another.

In various embodiments, cargo 20 may be become skewed for any number of reasons, such as responsive to a heavy bias in the mast towards one side or the other. In that regard, one side of the cargo 20, in response to being propelled by one or more of PDUs 210a-210e and 212a-212e, may translate faster than another side. In various embodiments, the controller 230 may be configured to send commands to engage or disengage driver rollers associated with various ones of PDUs, while engaging or disengaging other PDUs based on an IR sensor signal from the PDU itself or another PDU. In that regard, in various embodiments, in an attempt to move cargo 20 against the starboard side buttock line 218, the drive rollers of PDUs 210b-210e may be engaged and PDUs 212b-212e may be disengaged. Responsive to cargo 20 becoming skewed, as soon as an IR sensor 216 associated with PDU 212b detects the presence of the cargo 20 and the IR sensors 216 associated with PDUs 212c-212e failing to detect the presence of the cargo 20, then the controller 230 may be configured to send a command to disengage the drive roller of PDU 210b while continuing to drive the drive rollers of PDUs 210c-210e in order to correct the skew. Furthermore, in various embodiments, in order to prevent movement of the cargo 20 associated with PDU 212b, controller 230 may be configured to send a command to engage, if not already engaged, the brake roller associated with PDU 212b.

While not illustrated, in various embodiments, since the controller 230 is continuing to send commands to drive the drive rollers of PDUs 210c-210e in order to correct the skew, as soon as an IR sensor 216 associated with PDU 212c detects the presence of the cargo 20 and the IR sensors 216 associated with PDUs 212d-212e fail to detect the presence of the cargo 20, then the controller 230 is configured to send a command to disengage the drive roller of PDU 210c while continuing to drive the drive roller of PDUs 210d-210e in order to correct the skew. In various embodiments, in order to prevent movement of the cargo 20 associated with PDU 212c, controller 230 may be configured to send a command to engage, if not already engaged, the brake roller associated with PDU 212c. Further, since the controller 230 is continuing to send commands to drive the drive rollers of PDUs 210d-210e in order to correct the skew, as soon as an IR sensor 216 associated with PDU 212d detects the presence of the cargo 20 and the IR sensors 216 associated with PDUs 212e fails to detect the presence of the cargo 20, then the controller 230 is configured to send a command to disengage the drive roller of PDU 210d while continuing to drive the drive roller of PDU 210e in order to correct the skew. In various embodiments, in order to prevent movement of the cargo 20 associated with PDU 212d, controller 230 may be configured to send a command to engage, if not already engaged, the brake roller associated with PDU 212d. Finally, in various embodiments, since the controller 230 is continuing to send commands to drive the drive roller of PDU 210e in order to correct the skew, as soon as an IR sensor 216 associated with PDU 212e detects the presence of the cargo 20, then the controller 230 may be configured to send commands to disengage all brake rollers of each of PDUs 210a-210e and 212a-212e and to engage the drive rollers of each of PDUs 210a-210e and 212a-212e to move the cargo in the x-direction against the starboard side buttock line 218 in order to reduce abuse to the cargo 20 associated with the cargo 20 running into the starboard side buttock line 218 at an angle within the cargo compartment.

In other various embodiments, in an attempt to move cargo 20 against the starboard side buttock line 218, the drive rollers of PDUs 210b-210e and PDUs 212b-212e may be engaged. Responsive to cargo 20 becoming skewed, as soon as an IR sensor 216 associated with PDU 212b detects the presence of the cargo 20 and the IR sensors 216 associated with PDUs 212c-212e failing to detect the presence of the cargo 20, then the controller 230 may be configured to send a command to disengage the drive rollers of PDUs 210b and 212b while continuing to drive the drive rollers of PDUs 210c-210e and 212c-212e in order to correct the skew. Furthermore, in various embodiments, in order to prevent movement of the cargo 20 associated with PDU 212b, controller 230 may be configured to send a command to engage, if not already engaged, the brake roller associated with PDU 212b.

In various embodiments, since the controller 230 is continuing to send commands to drive the drive rollers of PDUs 210c-210e and PDUs 212c-212e in order to correct the skew, as soon as an IR sensor 216 associated with PDU 212c detects the presence of the cargo 20 and the IR sensors 216 associated with PDUs 212d-212e fail to detect the presence of the cargo 20, then the controller 230 is configured to send a command to disengage the drive rollers of PDUs 210*c* and 212*c* while continuing to drive the drive roller of PDUs 210*d*-210*e* and 212*d*-212*e* in order to correct the skew. In various embodiments, in order to prevent movement of the cargo 20 associated with PDU 212*c*, controller 230 may be configured to send a command to engage, if not already engaged, the brake roller associated with PDU 212*c*. Further, since the controller 230 is continuing send commands to drive the drive rollers of PDUs 210*d*-210*e* and 212*d*-212*e* in order to correct the skew, as soon as an IR sensor 216 associated with PDU 212*d* detects the presence of the cargo 20 and the IR sensors 216 associated with PDUs 212*e* fails to detect the presence of the cargo 20, then the controller 230 is configured to send a command to disengage the drive rollers of PDUs 210*d* and 212*d* while continuing to drive the drive rollers of PDU 210*e* and 212*e* in order to correct the skew. In various embodiments, in order to prevent movement of the cargo 20 associated with PDU 212*d*, controller 230 may be configured to send a command to engage, if not already engaged, the brake roller associated with PDU 212*d*. Finally, in various embodiments, since the controller 230 is continuing to send commands to drive the drive roller of PDU 210*e* and 212*e* in order to correct the skew, as soon as an IR sensor 216 associated with PDU 212*e* detects the presence of the cargo 20, then the controller 230 may be configured to send commands to disengage all brake rollers of each of PDUs 210*a*-210*e* and 212*a*-212*e* and to engage the drive rollers of each of PDUs 210*a*-210*e* and 212*a*-212*e* to move the cargo in the x-direction against the starboard side buttock line 218 in order to reduce abuse to the cargo 20 associated with the cargo 20 running into the starboard side buttock line 218 at an angle within the cargo compartment.

In other various embodiments, in an attempt to move cargo 20 against the starboard side buttock line 218, the drive rollers of PDUs 210*a*-210*e* and PDUs 212*a*-212*e* may be engaged. Responsive to cargo 20 becoming skewed, as soon as an IR sensor 216 associated with PDU 212*b* detects the presence of the cargo 20 and the IR sensors 216 associated with PDUs 212*a* and 212*c*-212*e* failing to detect the presence of the cargo 20, then the controller 230 may be configured to send a command to disengage all the drive rollers of PDUs 210*a*-210*e* and PDUs 212*a*-212*e* until the skew of the cargo is manually corrected. Responsive to the skew being manually corrected and the IR sensors 216 associated with PDUs 212*b*-212*e* detecting the presence of the cargo 20, then the controller 230 may be configured to send commands to disengage all brake rollers of each of PDUs 210*a*-210*e* and 212*a*-212*e* and to engage the drive rollers of each of PDUs 210*a*-210*e* and 212*a*-212*e* to move the cargo in the x-direction against the starboard side buttock line 218 in order to reduce abuse to the cargo 20 associated with the cargo 20 running into the starboard side buttock line 218 at an angle within the cargo compartment.

Referring now to FIG. 3, in accordance with various embodiments, a method for controlling the skew of cargo during loading is illustrated. The method 300 may be performed by a controller, such as controller 230 of FIG. 2. In various embodiments, the cargo compartment includes a starboard side set of PDUs along a port side of the cargo compartment and a port side set of PDUs along a second side of the cargo compartment, where PDUs from the starboard side set of PDU and from the port side set of PDUs operate in pairs. At block 302, the controller sends commands to drives rollers of the port side set of PDUs on a port side of a cargo compartment to move the cargo against a buttock line on the starboard side of the cargo compartment. At block

304, responsive to the controller determining that an IR sensor associated with a PDU in the starboard side set of PDUs on the starboard side of the cargo compartment has indicated a presence of the cargo while IR sensors associated with other PDUs in the starboard side set of PDUs fail to detect the presence of the cargo, the controller sends a command to disengage a drive roller of paired PDU in the port side set of PDUs and, at block 306, the controller sends commands to continue to drive the drive rollers of other PDUs in the port side set of PDUs in order to correct the skew. At block 308, the controller determines whether each IR sensor of each PDU in the starboard side set of PDUs is detecting the cargo. If at block 308 the controller determines that at least one IR sensor of the starboard side set of PDUs is not detecting the cargo, then the operation returns to block 304. If at block 308 the controller determines that all the IR sensors in the starboard side set of PDUs is detecting the cargo, at block 310, the controller is configured to send commands to disengage all brake rollers of each of the starboard side set of PDUs and the port side set of PDUs and to engage the drive rollers of each of the starboard side set of PDUs and the port side set of PDUs to move the cargo against the starboard side buttock line in order to reduce abuse to the cargo associated with the cargo running into a guide rail at an angle within the cargo compartment.

Referring now to FIG. 4, in accordance with various embodiments, a method for controlling the skew of cargo during loading is illustrated. The method 400 may be performed by a controller, such as controller 230 of FIG. 2. In various embodiments, the cargo compartment includes a starboard side set of PDUs along the starboard side of the cargo compartment and a port side set of PDUs along the port side of the cargo compartment, where PDUs from the starboard side set of PDU and from the port side set of PDUs operate in pairs. At block 402, the controller sends commands to drives rollers of the starboard side set of PDUs and the port side set of PDUs of a cargo compartment to move the cargo against a buttock line on a starboard side of the cargo compartment. At block 404, responsive to the controller determining that an IR sensor associated with a PDU in the starboard side set of PDUs on the starboard side of the cargo compartment has indicated a presence of the cargo while IR sensors associated with other PDUs in the starboard side set of PDUs fail to detect the presence of the cargo, the controller sends commands to disengage a drive roller of paired PDUs in the starboard side set of PDUs and the port side set of PDUs associated with the PDU in the starboard side set of PDUs on the starboard side of the cargo compartment that indicated the presence of the cargo and, at block 406, the controller sends commands to continue to drive the drive rollers of other PDUs in the starboard side set of PDUS and the port side set of PDUs in order to correct the skew. At block 408 controller determines whether each IR sensor of each PDU in the starboard side set of PDUs is detecting the cargo. If at block 408 the controller determines that at least one IR sensor of the starboard side set of PDUs is not detecting the cargo, then the operation returns to block 404. If at block 408 the controller determines that all the IR sensors in the starboard side set of PDUs is detecting the cargo, at block 410, the controller is configured to send commands to disengage all brake rollers of each of the starboard side set of PDUs and the port side set of PDUs and to engage the drive rollers of each of starboard side set of PDUs and the port side set of PDUs to move the cargo against the starboard side buttock line in order to reduce abuse to the cargo associated with the cargo running into a guide rail at an angle within the cargo compartment.

Referring now to FIG. 5, in accordance with various embodiments, a method for controlling the skew of cargo during loading is illustrated. The method 500 may be performed by a controller, such as controller 230 of FIG. s. In various embodiments, the cargo compartment includes a starboard side set of PDUs along a starboard side of the cargo compartment and a port side set of PDUs along a port side of the cargo compartment, where PDUs from the starboard side set of PDU and from the port side set of PDUs operate in pairs. At block 502, the controller sends commands to drives rollers of the starboard side set of PDUs and the port side set of PDUs of a cargo compartment to move the cargo against a buttock line on a starboard side of the cargo compartment. At block 504, responsive to the controller determining that an IR sensor associated with a PDU in the starboard side set of PDUs on the starboard side of the cargo compartment has indicated a presence of the cargo while IR sensors associated with other PDUs in the set of first PDUs fail to detect the presence of the cargo, the controller sends commands to disengage all of the drive rollers of the starboard side set of PDUs and the port side set of PDUs until the skew of the cargo is manually corrected. At block 506, responsive to the controller receiving an indication that the skew has been manually corrected, the controller send commands to disengage all brake rollers of each of the starboard side set of PDUs and the port side set of PDUs and to engage the drive rollers of each of starboard side set of PDUs and the port side set of PDUs to move the cargo against the starboard side buttock line in order to reduce abuse to the cargo associated with the cargo running into a guide rail at an angle within the cargo compartment.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo handling system, comprising:
   a set of first power drive units, wherein a first portion of the set of first power drive units are located in a set of ball panels along a port side of the cargo handling system and wherein a second portion of the set of first power drive units are located along the port side of a cargo deck of the cargo handling system separate from the set of ball panels; and
   a set of second power drive units, wherein a first portion of the set of second power drive units are located in the set of ball panels along a starboard side of the cargo handling system and wherein a second portion of the set of second power drive units are located along the starboard side of the cargo deck of the cargo handling system separate from the set of ball panels,
   wherein each of the set of first power drive units and the set of second power drive units comprising:
      a drive roller;
      a motor configured to rotate the drive roller; and
      an infrared sensor, wherein each power drive unit in the set of first power drive units is paired with a power drive in the set of second power drive units; and
   a controller, the controller is configured to:
      send a command to engage the drive roller of each of the set of first power drive units to drive a cargo in a first direction; and
      responsive to receiving a first signal from the infrared sensor from a first power drive unit in the set of second power drive units, send a command to disengage the drive roller of a paired first power drive unit in the set of first power drive units.

2. The cargo handling system of claim 1, wherein each of the set of first power drive units and the set of second power drive units further comprises:
   a brake roller,
   wherein the controller is further configured to, responsive to receiving the first signal from the infrared sensor from the first power drive unit in the set of second power drive units, send a command to engage, if not already engaged, a brake roller associated with the first power drive unit in the set of second power drive units.

3. The cargo handling system of claim 2, wherein the controller is further configured to:
   responsive to receiving a second signal from the infrared sensor from a second power drive unit in the set of second power drive units:
      send a command to disengage the drive roller of a paired second power drive unit in the set of first power drive units; and

13 send a command to engage, if not already engaged, a
brake roller associated with the second power drive
unit in the set of second power drive units.

4. The cargo handling system of claim 3, wherein the
controller is further configured to:
responsive to receiving a signal from each infrared sensor
of the set of second power drive units:
send a command to disengage all brake rollers associ-
ated with the set of second power drive units; and
send a command to engage the drive roller of each of
the set of first power drive units and the drive roller
of each of the set of second power drive units to drive
the cargo in the first direction.

5. The cargo handling system of claim 1, wherein the
controller is further configured to:
send a command to engage the drive roller of each of the
set of second power drive units to drive the cargo in the
first direction; and
responsive to receiving the first signal from the infrared
sensor from the first power drive unit in the set of
second power drive units, send a command to disen-
gage the drive roller associated with the first power
drive unit in the set of second power drive units.

6. The cargo handling system of claim 5, wherein each of
the set of first power drive units and the set of second power
drive units further comprises:
a brake roller,
wherein the controller is further configured to, responsive
to sending the command to disengage the drive roller
associated with the first power drive unit in the set of
second power drive units, sending a command to
engage, if not already engaged, a brake roller associ-
ated with the first power drive unit in the set of second
power drive units.

7. The cargo handling system of claim 6, wherein the
controller is further configured to:
responsive to receiving a signal from each infrared sensor
of the set of second power drive units:
send a command to disengage all brake rollers associ-
ated with the set of second power drive units; and
send a command to engage the drive roller of each of
the set of first power drive units and the drive roller
of each of the set of second power drive units to drive
the cargo in the first direction.

8. The cargo handling system of claim 1, wherein the
controller is configured to:
send a command to engage the drive roller of each of the
set of second power drive units to drive the cargo in the
first direction;
responsive to receiving the first signal from the infrared
sensor from the first power drive unit in the set of
second power drive units, send a command to disen-
gage all drive rollers in the set of first power drive units
and the set of second power drive units; and
responsive to receiving a signal from each infrared sensor
of the set of second power drive units, send a command
to engage the drive roller of each of the set of first
power drive units and the drive roller of each of the set
of second power drive units to drive the cargo in the
first direction.

9. An aircraft, the aircraft comprising:
cargo handling system, the cargo handling system com-
prising:
a set of first power drive units, wherein a first portion
of the set of first power drive units are located in a
set of ball panels along a port side of the cargo
handling system and wherein a second portion of the set of first power drive units are located along the
port side of a cargo deck of the cargo handling
system separate from the set of ball panels; and
a set of second power drive units, wherein a first
portion of the set of second power drive units are
located in the set of ball panels along a starboard side
of the cargo handling system and wherein a second
portion of the set of second power drive units are
located along the starboard side of the cargo deck of
the cargo handling system separate from the set of
ball panels,
wherein each of the set of first power drive units and the
set of second power drive units comprising:
a drive roller;
a motor configured to rotate the drive roller; and
an infrared sensor, wherein each power drive unit in
the set of first power drive units is paired with a
power drive in the set of second power drive units;
and
a controller, the controller is configured to:
send a command to engage the drive roller of each of
the set of first power drive units to drive a cargo
in a first direction; and
responsive to receiving a first signal from the infra-
red sensor from a first power drive unit in the set
of second power drive units, send a command to
disengage the drive roller of a paired first power
drive unit in the set of first power drive units.

10. The aircraft of claim 9, wherein each of the set of first
power drive units and the set of second power drive units
further comprises:
a brake roller,
wherein the controller is further configured to, responsive
to receiving the first signal from the infrared sensor
from the first power drive unit in the set of second
power drive units, send a command to engage, if not
already engaged, a brake roller associated with the first
power drive unit in the set of second power drive units.

11. The aircraft of claim 10, wherein the controller is
further configured to:
responsive to receiving a second signal from the infrared
sensor from a second power drive unit in the set of
second power drive units:
send a command to disengage the drive roller of a
paired second power drive unit in the set of first
power drive units; and
send a command to engage, if not already engaged, a
brake roller associated with the second power drive
unit in the set of second power drive units.

12. The aircraft of claim 11, wherein the controller is
further configured to:
responsive to receiving a signal from each infrared sensor
of the set of second power drive units:
send a command to disengage all brake rollers associ-
ated with the set of second power drive units; and
send a command to engage the drive roller of each of
the set of first power drive units and the drive roller
of each of the set of second power drive units to drive
the cargo in the first direction.

13. The aircraft of claim 9, wherein the controller is
further configured to:
send a command to engage the drive roller of each of the
set of second power drive units to drive the cargo in the
first direction; and
responsive to receiving the first signal from the infrared
sensor from the first power drive unit in the set of
second power drive units, send a command to disengage the drive roller associated with the first power drive unit in the set of second power drive units.

14. The aircraft of claim 13, wherein each of the set of first power drive units and the set of second power drive units further comprises:

a brake roller, wherein the controller is further configured to, responsive to sending the command to disengage the drive roller associated with the first power drive unit in the set of second power drive units, sending a command to engage, if not already engaged, a brake roller associated with the first power drive unit in the set of second power drive units.

15. The aircraft of claim 14, wherein the controller is further configured to:

responsive to receiving a signal from each infrared sensor of the set of second power drive units:

send a command to disengage all brake rollers associated with the set of second power drive units; and send a command to engage the drive roller of each of the set of first power drive units and the drive roller of each of the set of second power drive units to drive the cargo in the first direction.

16. The aircraft of claim 9, wherein the controller is configured to:

send a command to engage the drive roller of each of the set of second power drive units to drive the cargo in the first direction;

responsive to receiving the first signal from the infrared sensor from the first power drive unit in the set of second power drive units, send a command to disengage all drive rollers in the set of first power drive units and the set of second power drive units; and responsive to receiving a signal from each infrared sensor of the set of second power drive units, send a command to engage the drive roller of each of the set of first power drive units and the drive roller of each of the set of second power drive units to drive the cargo in the first direction.

17. A method for correcting skewed cargo, the method comprising:

sending, by a controller, a command to engage a drive roller of each of a set of first power drive units to drive a cargo in a first direction, wherein a first portion of the set of first power drive units are located in a set of ball panels along a port side of the cargo handling system and wherein a second portion of the set of first power drive units are located along the port side of a cargo deck of the cargo handling system separate from the set of ball panels; and responsive to receiving a first signal from the infrared sensor from a first power drive unit in a set of second power drive units, sending, by the controller, a command to disengage the drive roller of a paired first power drive unit in the set of first power drive units, wherein a first portion of the set of second power drive units are located in the set of ball panels along a starboard side of the cargo handling system and wherein a second portion of the set of second power drive units are located along the starboard side of the cargo deck of the cargo handling system separate from the set of ball panels.

18. The method of claim 17, further comprising:

responsive to receiving the first signal from the infrared sensor from the first power drive unit in the set of second power drive units, sending, by the controller, a command to engage, if not already engaged, a brake roller associated with the first power drive unit in the set of second power drive units.

19. The method of claim 18, further comprising:

responsive to receiving a second signal from the infrared sensor from a second power drive unit in the set of second power drive units:

sending, by the controller, a command to disengage the drive roller of a paired second power drive unit in the set of first power drive units; and sending, by the controller, a command to engage, if not already engaged, a brake roller associated with the second power drive unit in the set of second power drive units.

20. The method of claim 19, further comprising:

responsive to receiving a signal from each infrared sensor of the set of second power drive units:

sending, by the controller, a command to disengage all brake rollers associated with the set of second power drive units; and sending, by the controller, a command to engage the drive roller of each of the set of first power drive units and the drive roller of each of the set of second power drive units to drive the cargo in the first direction.

* * * * *